March 24, 1970   H. B. CLEVELAND   3,502,371
SELF-UNLOADING VEHICLE BODY
Filed June 17, 1968
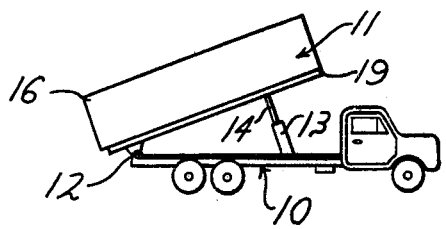
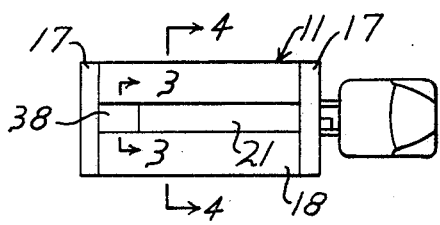
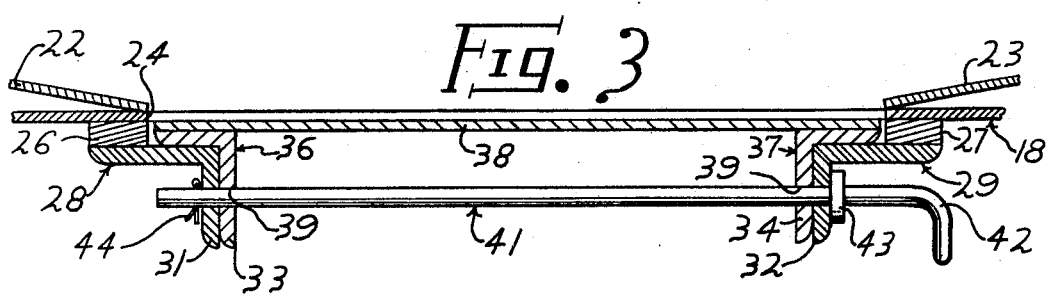
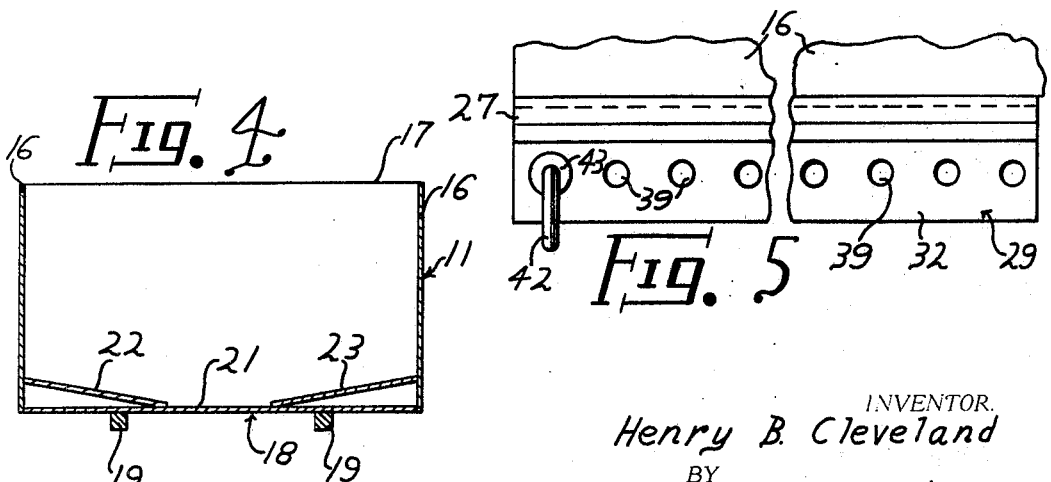
INVENTOR.
Henry B. Cleveland
BY
Jennings, Carter & Thompson
Attorneys

United States Patent Office 3,502,371
Patented Mar. 24, 1970

3,502,371
SELF-UNLOADING VEHICLE BODY
Henry B. Cleveland, Box 193,
Magnolia Springs, Ala. 36555
Filed June 17, 1968, Ser. No. 737,635
Int. Cl. B60p 1/56
U.S. Cl. 298—1      4 Claims

ABSTRACT OF THE DISCLOSURE

A self-unloading body connected to a vehicle for pivotal movement relative thereto and having a bottom wall comprising a longitudinally extending central portion with upwardly and outwardly extending side portions. A cover member, movable to selected positions relative to a discharge opening adjacent the rear of the central portion, controls and discharge of materials.

BACKGROUND OF THE INVENTION

This invention relates to a self-unloading vehicle body and more particularly to a vehicle body which is pivotally connected adjacent its rear end to the rear end of a truck frame and is provided with means for elevating the forward end of the body, together with improved means for discharging materials therefrom.

Heretofore in the art to which my invention relates, difficulties have been encountered in unloading certain materials from vehicle bodies due to the fact that the materials tend to cling to the sides and corners of the body and do not flow freely therefrom. Also, with bodies heretofore employed, the materials have been discharged across the entire width of the body rather than being discharged at a centrally disposed location.

In accordance with my invention, I provide a truck body which is adapted for pivotal movement from a generaly horizontal position to a tilted position. The bottom wall of the body is provided with a horizontal, centrally disposed portion which extends the length of the body. Upwardly and outwardly extending side portions are joined to each side of the centrally disposed portion whereby materials flow inwardly to the centrally disposed portion as materials are discharged adjacent the rear of the centrally disposed portion.

A further object of my invention is to provide a self-unloading vehicle body of the character designated which shall include improved means for controlling the flow of materials adjacent the rear end of the centrally disposed portion whereby the materials may be discharged at any desired rate of flow, thus facilitating unloading of materials onto conveyors, loading docks, containers or the like.

A still further object of my invention is to provide a self-unloading vehicle body of the character designated which shall be extremely simple of construction, economical of manufacture and one which is particularly adapted for receiving farm products as they are harvested and then conveying the products to any desired location where they are discharged from the body with a minimum of effort.

Apparatus embodying features of my invention is illustrated in the accompanying drawing, forming a part of this application, in which:

FIG. 1 is a side elevational view showing the body in tilted position on a vehicle;

FIG. 2 is a top plan view of the apparatus shown in FIG. 1;

FIG. 3 is an enlarged, sectional view taken generally along the line 3—3 of FIG. 2;

FIG. 4 is an enlarged, sectional view taken generally along the line 4—4 of FIG. 2; and FIG. 5 is a fragmental view showing a side of the mechanism for regulating the flow of materials discharged from the body.

Referring now to the drawing for a better understanding of my invention, I show a vehicle frame 10 having my improved body 11 mounted for pivotal movement thereon by a suitable pivot connection indicated generally at 12. A fluid pressure operated cylinder 13 is mounted on the vehicle frame 10 and is provided with a piston rod 14 which is operatively connected to the undersurface of the body 11 whereby the body may be moved from a generally horizontal position to a tilted position, as shown in FIG. 1.

The body 11 is provided with upstanding side walls 16 and upstanding end walls 17 and a bottom wall 18 which is mounted on longitudinally extending frame members 19 which engage longitudinally extending portions of the vehicle frame 10 and also add structural strength to the vehicle body. As shown in FIGS. 2 and 4, the bottom wall 18 is provided with a centrally disposed portion 21 which extends in a horizontal plane and extends longitudinally of the body 11 substantially from end to end thereof. Joined to each side of the longitudinally extending central portion 21 of the bottom wall 18 are upwardly and outwardly extending side portions 22 and 23 which define with the horizontal centrally disposed portion 21 an included angle of at least 10°. By providing outwardly and upwardly sloping side portions 22 and 23 for the bottom wall of the body, the materials tend to flow inwardly toward the longitudinally extending central portion 21 as materials are discharged in a manner now to be described.

As shown in FIG. 3, an opening 24 is provided at the rear of the longitudinally extending central portion 21 adjacent the rearmost end wall 17 for discharging materials from the body. Secured to the undersurface of the bottom wall 18 adjacent the opening 24 are a pair of longitudinally extending spacer members 26 and 27. Secured to the undersurface of the spacer members 26 and 27 are angle members 28 and 29 having depending flange-like members 31 and 32, respectively, which extend generally in vertical planes, as shown in FIG. 3. Mounted for longitudinal sliding movement adjacent the depending flange-like members 31 and 32 are depending flange-like members 33 and 34, respectively, of angle members 36 and 37.

Secured to the upper surface of the angle members 36 and 37 is a closure plate 38 which is of a size to completely close the opening 24. That is, the closure plate 38 together with its angle-like members 36 and 37 form a closure member which is adapted to move to selected positions relative to the bottom wall 18 to vary the size of the discharge opening for discharging materials from the body. Longitudinally spaced openings 39 are provided in the depending flange-like members 31, 32, 33 and 34 for receiving an elongated rod or pin 41 having a handle portion 42. A collar 43 limits inward movement of the pin 41, as shown in FIG. 3. A suitable locking device, such as a cotter pin 44, secures the pin or rod 41 in place in selected ones of the aligned openings 39. The closure plate 38 is movable forwardly toward the forward end of vehicle frame 10 whereby the discharge opening is at the lowermost end of the centrally disposed portion 21.

From the foregoing description, the operation of my improved self unloading vehicle body will be readily understood. Materials, such as farm produce or the like, are introduced into the body 11 while it is in a horizontal position. The closure member 38 is in position to completely cover the discharge opening 24 while the materials are loaded. To discharge the materials from the body 11, the cotter pin 44 is removed and the rod 41 is then removed from the aligned openings 39 whereby the closure plate 38 may be moved to selected positions to vary the rate of discharge of materials from the body 11. The closure plate 38 may be locked in selected ones of these positions by aligning the openings 39 in the angles 36 and 37 with the openings 39 in the angle members 28 and 29 and then inserting the rod 41 to secured the closure plate 38 at the selected position. The fluid pressure operated cylinder 13 is then actuated to elevate the forward end of the body 11 whereby it assumes the general position shown in FIG. 1 of the drawing. The materials are then discharged continuously through the opening 24 and the discharge space which is determined by the position of the closure plate 38. The materials adjacent the vertical sides 16 of the body 11 tend to flow inwardly due to the sloping side portions 22 and 23. Accordingly, all of the materials in the body 11 flow inwardly to the centrally disposed portion 21 and are discharged through the opening 24 at a predetermined rate which is determined by the position of the plate 38 relative to the bottom wall 18. After the materials are discharged, the rod 41 is again removed and the closure plate 38 is moved to closed position whereupon the rod 41 is again inserted through aligned openings 39 to secure the closure member in closed position for receiving another load.

From the foregoing, it will be seen that I have devised an improved self-unloading body for a vehicle which not only assures a constant and uniform flow of materials from the vehicle but also prevents the accumulation of materials adjacent the sides thereof. Also, by providing a centrally disposed discharge mechanism together with means for holding the discharge mechanism at selected positions to vary the rate of discharge, I not only discharge the materials at a predetermined rate but also discharge the materials at a central point whereby the materials may be discharged onto a conveyor, into containers or onto any other receiving units for the materials. Furthermore, it will be seen that I have devised an improved vehicle body which is extremely simple of construction and manufacture and one which is trouble-free in operation.

While I have shown my invention in but one form, it will be obvious to those skilled in the art that it is not so limited, but is susceptible of various other changes and modifications without departing from the spirit thereof.

What I claim is:

1. In a self-unloading body pivotally mounted adjacent one end to the rear end of a vehicle with means between the said body and the vehicle to move the body to selected pivoted positions:
   (a) a bottom wall for said body comprising a horizontal, centrally disposed portion extending longitudinally of said body with downwardly and inwardly extending side portions joined to each side of the centrally disposed portions,
   (b) there being a discharge opening at the rear end of and extending all the way across said centrally disposed portion of said bottom wall leaving only downwardly and inwardly sloping surfaces on said bottom wall outwardly of said discharge opening,
   (c) a closure member for said opening mounted beneath said bottom wall for sliding movement relative to adjacent portions of said bottom wall to vary the size of said opening, and
   (d) releasable latch means operatively connecting said closure member to said bottom wall and holding said closure member at selected positions relative to said discharge opening to regulate the flow of materials through said opening.

2. A self-unloading body as defined in claim 1 in which the downwardly and inwardly extending side portions define with a horizontal plane passing through said centrally disposed portion an included angle of at least 10°.

3. A self-unloading body as defined in claim 1 in which said releasable latch means comprises:
   (a) depending flange-like members carried by said closure member,
   (b) other depending flange-like members carried by said bottom wall in position to extend alongside the first mentioned flange-like members carried by said closure member, and
   (c) means detachably connecting said flange-like members to each other.

4. A self-unloading body as defined in claim 3 in which said depending flange-like members have longitudinally spaced openings therethrough which are adapted to move into alignment with each other and an elongated pin extends through said aligned openings to hold the closure member at selected positions.

References Cited

UNITED STATES PATENTS

| | | | |
|---|---|---|---|
| 1,093,952 | 4/1914 | Stephens | 298—7 |
| 1,368,886 | 2/1921 | Bradley | 298—1 X |
| 1,948,170 | 2/1934 | Forde | 298—19 X |
| 2,303,033 | 11/1942 | Elliott | 298—1 |
| 2,530,574 | 11/1950 | Getman | 298—17 |

RICHARD J. JOHNSON, Primary Examiner

U.S. Cl. X.R.

298—22